(12) United States Patent
Wolff et al.

(10) Patent No.: US 9,479,258 B1
(45) Date of Patent: Oct. 25, 2016

(54) ELECTRICAL ADD/DROP MULTIPLEXER WITH PASS THROUGH PORT RELATED APPLICATIONS

(75) Inventors: Peter Wolff, South Windsor, CT (US); Zoran Maricevic, West Hartford, CT (US); Ventatesh Mutalik, Middleton, CT (US); Marcel F Schemmann, Maria Hoop (NL)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 12/711,928

(22) Filed: Feb. 24, 2010

Related U.S. Application Data

(60) Provisional application No. 61/155,141, filed on Feb. 24, 2009.

(51) Int. Cl.
*H04B 10/00* (2013.01)
*H04B 10/40* (2013.01)

(52) U.S. Cl.
CPC .................................... *H04B 10/40* (2013.01)

(58) Field of Classification Search
USPC .................................................. 398/135–139
See application file for complete search history.

(56) References Cited

U.S. PATENT DOCUMENTS

| | | | | |
|---|---|---|---|---|
| 4,244,045 A * | 1/1981 | Nosu | G02B 6/29367 | 398/86 |
| 4,707,064 A * | 11/1987 | Dobrowolski | G02B 6/2938 | 359/589 |
| 5,165,079 A * | 11/1992 | Schulz-Hennig | G01J 3/12 | 359/634 |
| 5,521,733 A * | 5/1996 | Akiyama | G02B 6/29362 | 398/48 |
| 6,252,719 B1 * | 6/2001 | Eichenbaum | G02B 27/145 | 359/634 |
| 6,396,978 B1 * | 5/2002 | Grann | G02B 6/29358 | 385/24 |
| 6,445,841 B1 * | 9/2002 | Gloeckner | G02B 6/3514 | 385/17 |
| 6,563,976 B1 * | 5/2003 | Grann | G02B 6/29311 | 385/24 |
| 6,751,373 B2 * | 6/2004 | Jeong | G02B 6/29362 | 359/589 |
| 6,931,174 B2 * | 8/2005 | Margalit | G02B 6/29362 | 385/24 |
| 6,939,058 B2 * | 9/2005 | Gurevich | G02B 6/4206 | 385/88 |
| 6,941,047 B2 * | 9/2005 | Capewell | G02B 6/29367 | 385/33 |
| 6,945,711 B2 * | 9/2005 | Chen | G02B 6/4249 | 385/93 |
| 7,349,602 B2 * | 3/2008 | Panotopoulos | G02B 6/29367 | 385/24 |
| 8,126,329 B2 * | 2/2012 | Murry | H04J 14/0206 | 398/130 |
| 2007/0248358 A1 * | 10/2007 | Sauer | G02B 6/4416 | 398/115 |
| 2012/0121270 A1 * | 5/2012 | Logan | H04B 10/25754 | 398/116 |

\* cited by examiner

*Primary Examiner* — Agustin Bello
(74) *Attorney, Agent, or Firm* — Bart A. Perkins

(57) ABSTRACT

An upgradeable electrical add/drop multiplexer is provided that is capable of processing light at numerous wavelengths thereby eliminating the need to add an optical add/drop multiplexer to an existing electrical add/drop multiplexer to process new services provided at different wavelengths than the wavelengths for which the existing electrical add/drop multiplexer are designed. The electrical add/drop multiplexer may be used to process light transmitted over a passive optical network under an RFoG, EPON, and/or 10GPON standard or any combination thereof or may be upgraded for future standards.

10 Claims, 4 Drawing Sheets

ELECTRICAL ADD/DROP MULTIPLEXER WITH PASS THROUGH PORT RELATED APPLICATIONS

This application claims the benefit of and incorporates by reference in its entirety U.S. Provisional Application No. 61/155,141, entitled "Multiplexer with Electrical and Optical Input and Output" and filed on Feb. 24, 2009.

FIELD

The present disclosure generally relates to electrical add/drop multiplexers used in fiber optic networks.

BACKGROUND

Electrical add/drop multiplexers are widely used in fiber optic networks to terminate fibers at customer premises such as houses and offices. An electrical add/drop multiplexer converts optical signals received from the fiber optic network to electrical signals for use by equipment at a customer premise such as cable modems, set-top boxes, IP phone, IP video adapters, wireless routers, or any other equipment. An electrical add/drop multiplexer also converts electrical signals received by equipment at a customer premise to optical signals for transport by a connected fiber to a remote destination.

An electrical add/drop multiplexer includes wavelength selective elements that are used to provide specific wavelength ranges of the light present on a fiber to respective electro-optical components of the multiplexer. The electro-optical components of the electrical add/drop multiplexer convert the light received to electrical signals. For example, the wavelength selective elements of the electrical add/drop multiplexer may be used in conjunction with respective electro-optical components to provide at separate outputs of the multiplexer voice, data, video, and/or telemetry signals that are combined on the input fiber. The electrical add/drop multiplexer also may include an electro-optical component for converting digital data to light at a specific wavelength range for transport by the fiber to a remote location.

However, electrical add/drop multiplexers lack flexibility. That is, electrical add/drop multiplexers are useful only for those specific wavelength ranges of light that the electro-optical components of the multiplexer can process. Accordingly, if there is a need to process light at different wavelengths, then the electrical add/drop multiplexer must be upgraded with additional components.

For example, FIG. 2 illustrates an electrical add/drop multiplexer 200 used to process light at specific wavelengths. Electrical add/drop multiplexer 200 includes a fiber connector 202 connected to a collimator subassembly 203; an optical wavelength selective filter 205; a receiver 207; and a transmitter 210.

A fiber 201 from the optical network terminates at the fiber connector 202, and the collimator subassembly 203 generates a collimated beam 204. Filter 205 passes a specific wavelength of the collimated beam 204 to receiver 207. Receiver 207 converts the optical signal received to electrical signals for use by external equipment. Transmitter 210 converts electrical signals received from external equipment to optical signals of a specific wavelength, which then passes through filter 205, collimator sub-assembly 203, and fiber connector 202 for transport by fiber 200 to a remote destination.

FIG. 3 illustrates the additional components needed to upgrade the electrical add/drop multiplexer 200 of FIG. 2 to process additional light at different wavelengths (i.e., "upgraded wavelength(s)"). More specifically, an optical add/drop multiplexer 300' and a second add/drop multiplexer 300 are added to electrical add/drop multiplexer 200 to process additional light at the upgraded wavelengths.

In the upgraded system, the fiber 301 from the optical network terminates at the optical add/drop multiplexer 300' instead of the electrical add/drop multiplexer 200. The optical add/drop multiplexer 300' couples light in a particular wavelength range that includes the upgraded wavelengths to an upgrade fiber 311 that is connected to the second add/drop multiplexer 300. The optical add/drop multiplexer 300' couples the other wavelengths of light from fiber 301 to fiber 201. The second add/drop multiplexer 300 may be designed to process light at the upgraded wavelengths that are received on fiber 311.

The electrical add/drop multiplexer 300 is similar to electrical add/drop multiplexer 200 except that filter 306 passes to receiver 308 a different wavelength (i.e., one of the upgraded wavelengths) of light received from the optical network than the wavelength of light passed by filter 205. Similarly, transmitter 309 converts electrical signals received from external equipment to optical signals of a different wavelength (i.e., one of the upgraded wavelengths) than the wavelength of the optical signal from transmitter 210. The optical signals of the upgraded wavelength pass through filter 306, collimator sub-assembly 303, fiber connector 302, and upgrade fiber 311. The optical add/drop multiplexer 300' combines the light from upgrade fiber 311 transmitted from transmitter 309 with the light from the fiber 201 transmitted from transmitter 210 for transport by fiber 301 to a remote destination.

As illustrated by FIG. 3, upgrading an existing electrical add/drop multiplexer to process light at different wavelengths requires multiple additional components, which is costly and inefficient. Accordingly, as the number of new services provided at different wavelengths of light continues to grow, so does the need to reduce the cost to upgrade existing equipment at the customer premise to provide these additional services will grow.

SUMMARY

An embodiment of the present invention include a plurality of serially arranged wavelength selective filters configured to filter light at a first set of plurality of wavelengths, respectively. A plurality of receivers can operate to receive the filtered beams of light from the plurality of wavelength selective filters. Each of the plurality of receivers is configured to process the filtered beam of light received at its respective wavelength. A plurality of transmitters can operate to receive electrical signals and convert the electrical signals to light at a second set of plurality of wavelengths, respectively.

At least one of the wavelengths of the first set of plurality of wavelengths is a wavelength based on a first standard. In one embodiment, the first standard is a radio frequency on glass (RFoG) standard. In another embodiment, the first standard is an ethernet passive optical network (EPON) standard. In another embodiment, the first standard is a 10G-EPON (10 gigabit EPON) standard. At least another one of the wavelengths of the first set of plurality of wavelengths is a wavelength based on a second standard.

In another embodiment, at least one of the wavelengths of the second set of plurality of wavelengths is a wavelength based on a first standard and at least another one of the wavelengths of the second set of plurality of wavelengths is a wavelength based on a second standard.

In another embodiment, a collimator is provided to receive the beam of light passed through the last wavelength selective filter of the plurality of wavelength selective filters that are serially arranged.

Both the foregoing general description and the following detailed description are exemplary and explanatory only and are not restrictive of the invention, as claimed.

DETAILED DESCRIPTION

Reference throughout this specification to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations may not be shown or described in detail to avoid obscuring aspects of the invention.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list, and any combination of the items in the list.

Figure 1:
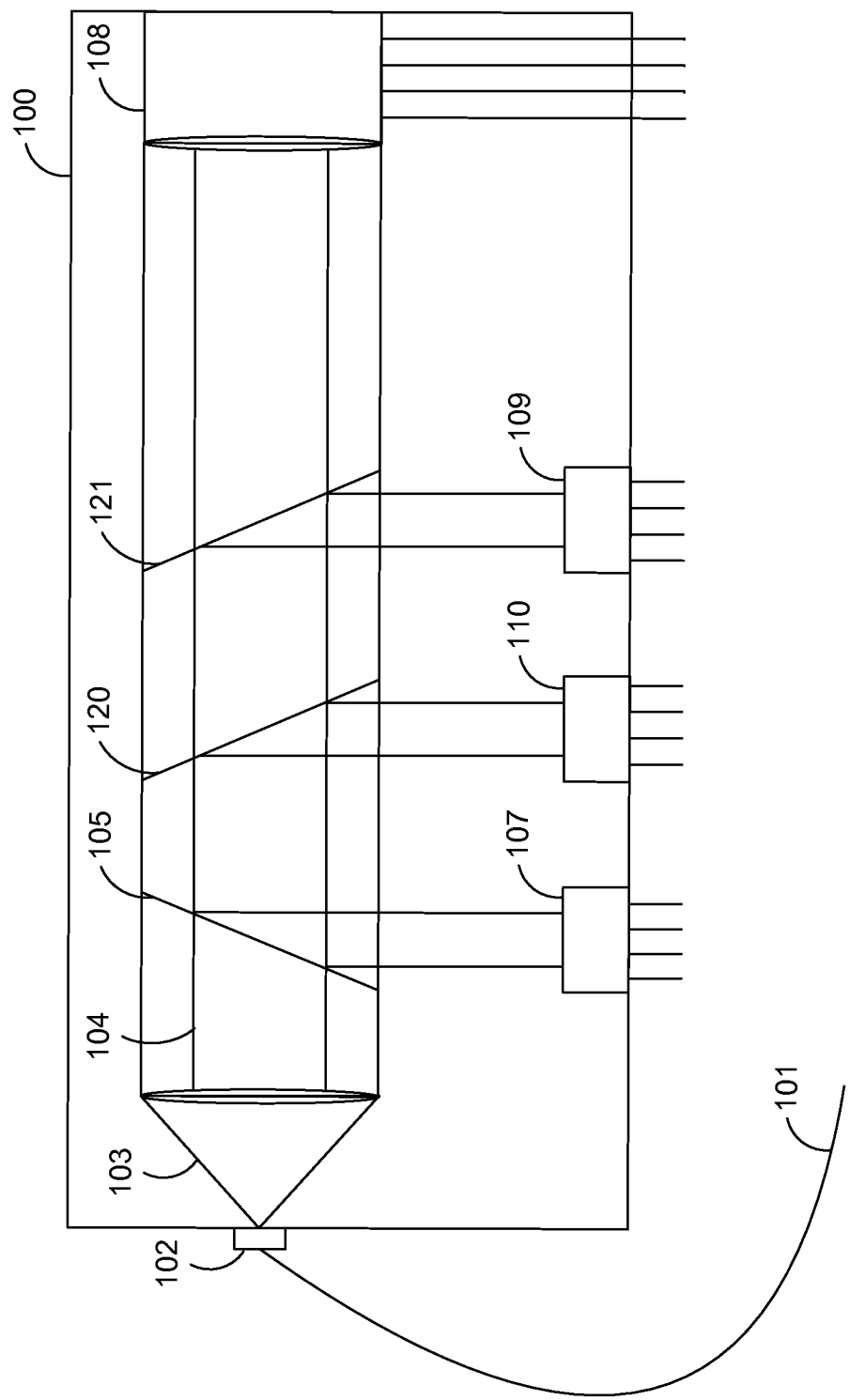
FIG. 1 illustrates an electrical add/drop multiplexer according to an embodiment of the present invention.
Figure 2:
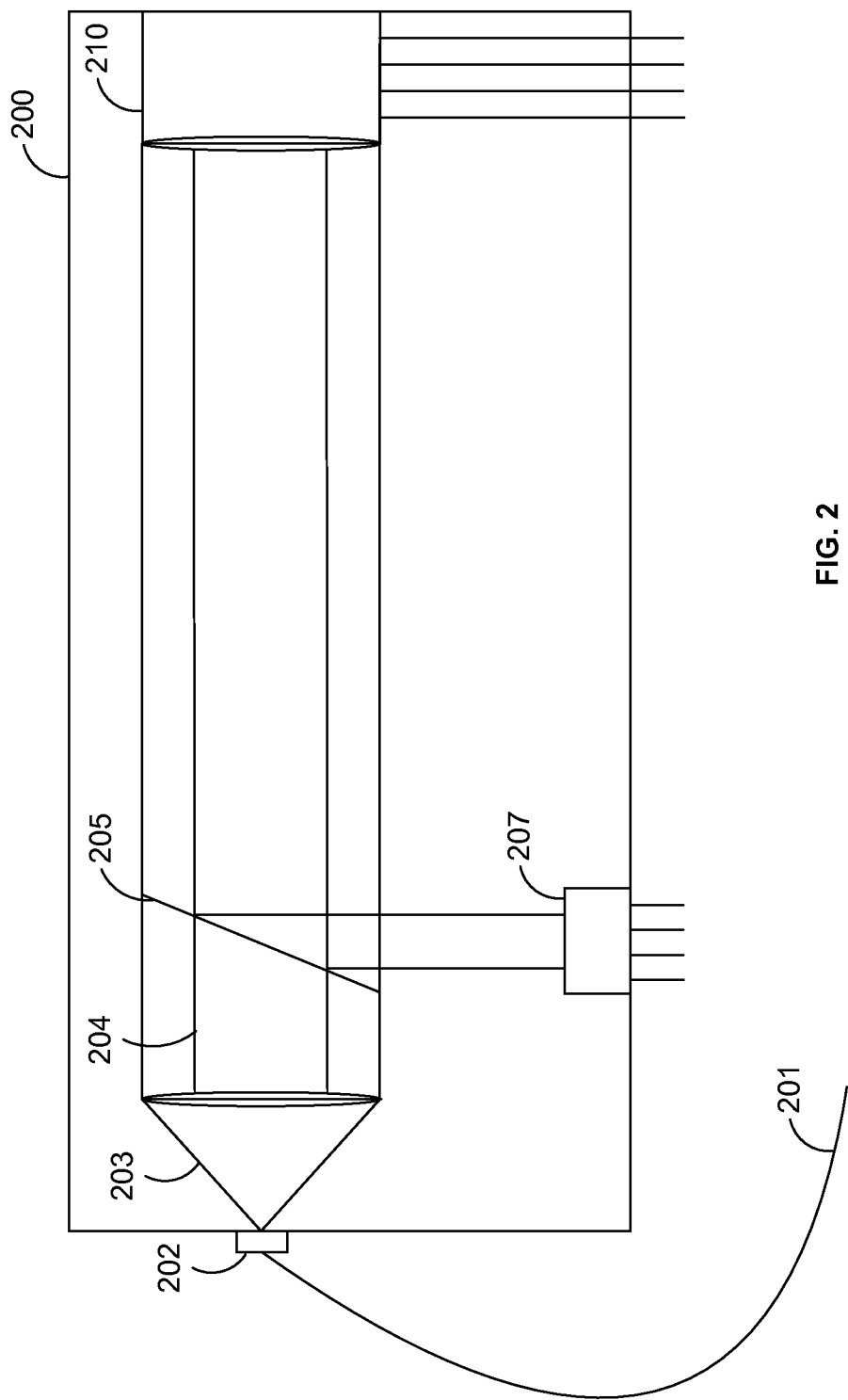
FIG. 2 illustrates a prior art electrical add/drop multiplexer.

FIG. 1 illustrates an exemplary electrical add/drop multiplexer 100 according to an exemplary embodiment of the present invention. Electrical add/drop multiplexer 100 includes a fiber connector 102 connected to a collimator subassembly 103; optical wavelength selective filters 105, 120, and 121; receivers 107, 108; and transmitters 109, 110.

A fiber 101 from the optical network transporting light at various wavelengths for a variety of services terminates at fiber connector 102, and collimator 103 generates a collimated beam 104. Filter 105 passes a specific wavelength of the collimated beam 104 to receiver 107. Receivers 107, 108 convert the optical signal received to electrical signals for use by external equipment. Transmitter 109 converts electrical signals received from external equipment to optical signals of a specific wavelength, which then may pass through filter 121, collimator sub-assembly 103, and fiber connector 102 for transport by fiber 101 to a remote destination. Similarly, transmitter 110 converts electrical signals received from external equipment to optical signals that may be of a different wavelength, which then may pass through filter 120, collimator sub-assembly 103, and fiber connector 102 for transport by the fiber 101 to a remote destination.

Figure 3:
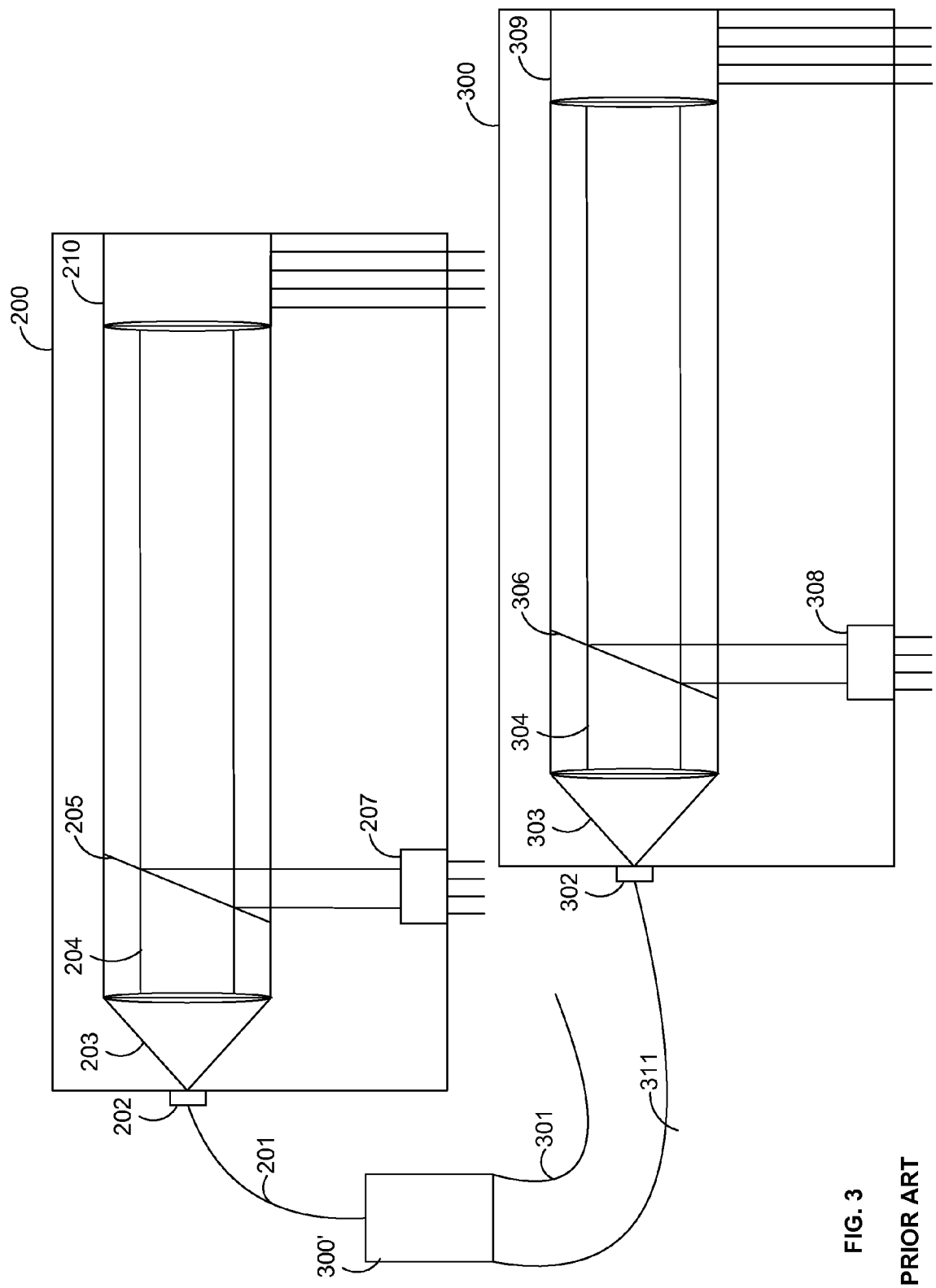
FIG. 3 illustrates a prior art electrical add/drop multiplexer upgraded using an optical add/drop multiplexer and a second add/drop multiplexer.

Accordingly, the electrical add/drop multiplexer 100 is capable of processing light at numerous wavelengths, thereby eliminating the need for an optical add/drop multiplexer 300' as illustrated in FIG. 3. For example, the electrical add/drop multiplexer 100 may be used to process light transmitted over a passive optical network under both an RFoG and EPON standard. More specifically, receiver 107 may be a 1551 nm RFoG receiver, receiver 108 may be a 1490 nm PON receiver, transmitter 109 may be a 1311 nm PON transmitter, and transmitter 110 may be a 1611 nm RFoG transmitter.

Figure 4:
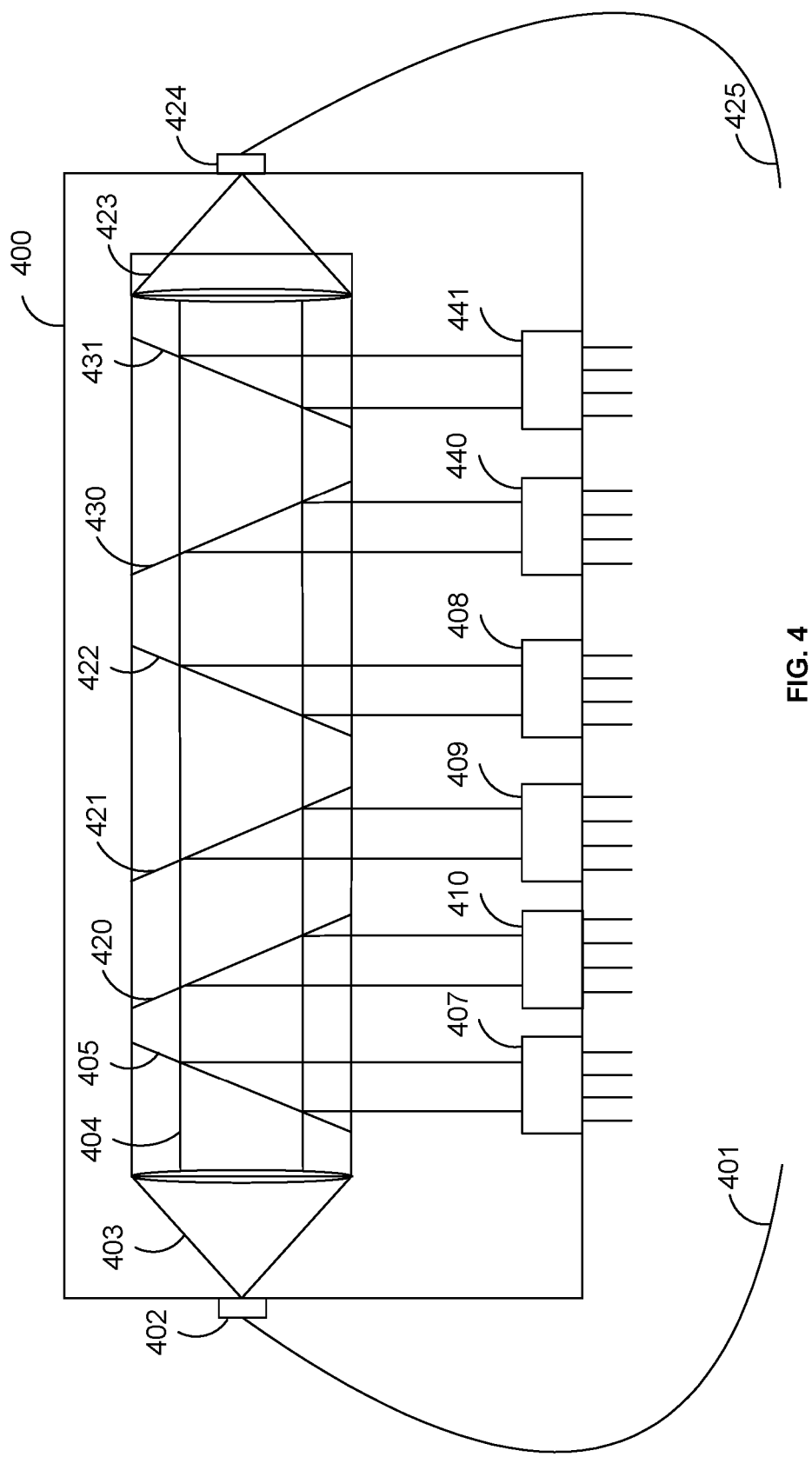
FIG. 4 illustrates an upgradeable electrical add/drop multiplexer according to an embodiment of the present invention.

FIG. 4 illustrates an exemplary electrical add/drop multiplexer 400 according to another embodiment of the present invention. Similarly to electrical add/drop multiplexer 100, electrical add/drop multiplexer 400 is capable of processing light at numerous wavelengths, however, electrical add/drop multiplexer 400 also is capable of being upgraded to process light at additional wavelengths.

Electrical add/drop multiplexer 400 includes a fiber connector 402 connected to a collimator subassembly 403; optical wavelength selective filters 405, 420, 421, 422, 430, 431; receivers 407, 408, 441; transmitters 409, 410, 440; collimator subassembly 423; and fiber connector 424. Similar to electrical add/drop multiplexer 100, a fiber 401 from the optical network that transports light at various wavelengths for a variety of services terminates at fiber connector 402, and collimator subassembly 403 generates a collimated beam 404. Filters 405, 422, 431 pass specific wavelengths of the collimated beam 404 to receivers 407, 408, 441, respectively. Receivers 407, 408, 441 convert the optical signals received to electrical signals for use by external equipment. Transmitters 409, 410, 440 convert electrical signals received from external equipment to optical signals of specific wavelengths, which then may pass through filters 421, 420, 430 respectively, collimator sub-assembly 403, and fiber connector 402 for transport by fiber 401 to a remote destination. The wavelengths of light that pass through the optical wavelength selective filters 405, 420, 421, 422, 430, 431 (i.e., light at unused wavelengths) are received at collimator subassembly 423, which couples the light to fiber connector 424 for use by fiber 425.

Electrical add/drop multiplexer 400 may be upgraded for additional services provided at different wavelengths of light by connecting additional equipment to fiber 425 such as, for example, a second electrical add/drop multiplexer 100, 400. As with electrical add/drop multiplexer 100, the electrical add/drop multiplexer 400 may be used to process light transmitted over a passive optical network under an RFoG and EPON standard when receiver 407 is a 1551 nm RFoG receiver, receiver 408 is a 1490 nm PON receiver, transmitter 409 is a 1311 nm PON transmitter, and transmitter 410 is a 1611 nm RFoG transmitter. Electrical add/drop multiplexer 400 may also be used to process light transmitted over a passive optical network under a 10GPON standard when receiver 441 is a 10GPON receiver and transmitter 440 is a 10GPON transmitter.

Many modifications and other embodiments of the invention will come to mind to one skilled in the art to which this invention pertains having the benefit of the teachings presented in the forgoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a first collimator operable to receive a first input optical signal into a first fiber port, and to split the beam into a collimated beam;
   a plurality of wavelength selective filters operable to receive the collimated beam and configured to filter light at a first set of plurality of wavelengths, respectively, wherein the wavelength selective filters are arranged serially, thereby passing a first modified collimated beam while selectively filtering optical signals at the first set of plurality of wavelengths;
   a second collimator to receive the modified collimated beam, the beam of light having been passed through a last wavelength selective filter of the plurality of wavelength selective filters that are serially arranged, wherein the second collimator is configured to process the modified collimated beam for output as a first output optical signal at a second fiber port;
   a plurality of receivers configured to respectively receive the selectively filtered optical signals from the plurality of wavelength selective filters via the first collimator, wherein each of the plurality of receivers is configured to process the selectively filtered optical signals received at its respective wavelength and convert the respective selectively filtered optical signals into an electrical signal for output to one or more output electrical ports; and
   a plurality of transmitters configured to receive electrical signals at one or more input electrical ports and convert the electrical signals to optical signals, respectively, wherein the optical signals that are converted from the received electrical signals are passed through a plurality of wavelength selective filters operable to filter light at a second set of plurality of wavelengths, and wherein the filtered optical signals that are converted from the received electrical signals are received at the first collimator and output at the first fiber port;
   wherein at least one of the wavelengths of the first set of plurality of wavelengths is a wavelength based on a first standard; and
   wherein at least another one of the wavelengths of the first set of plurality of wavelengths is a wavelength based on a second standard;
   wherein the second collimator is further operable to receive a second input optical signal at the second fiber port, collimate the second input optical signal, and pass a second collimated beam to the plurality of wavelength selective filters to generate a second modified collimated beam, wherein the first collimator is operable to receive the second modified collimated beam and to produce a second output optical signal at the first fiber port.

2. The apparatus of claim 1:
   wherein at least one of the wavelengths of the second set of plurality of wavelengths is a wavelength based on a first standard; and
   wherein at least another one of the wavelengths of the second set of plurality of wavelengths is a wavelength based on a second standard.

3. The apparatus of claim 1, wherein the first standard is an RFoG standard.

4. The apparatus of claim 1, wherein the first standard is an EPON standard.

5. The apparatus of claim 1, wherein the first standard is a 10GPON standard.

6. The apparatus of claim 1, wherein the apparatus facilitates adding additional signals to the fiber by coupling a second apparatus to the second fiber port.

7. An optical add/drop multiplexer, comprising:
   a first collimator operable to receive an input beam from a first optical fiber via a first optical port and to collimate the input beam to produce a first collimated beam;
   a serially arranged plurality of wavelength selective filters operable to receive the collimated beam, each wavelength selective filter being operable to select one or more wavelengths of the collimated beam while passing remaining wavelengths of the collimated beam, wherein the serially arranged plurality of wavelength selective filters pass non-selected wavelengths to produce a modified collimated beam comprising one or more non-selected optical signals;
   a plurality of receivers respectively coupled to a first set of the serially arranged plurality of wavelength selective filters and operable to output a respective plurality of output signals based on the wavelength selective filter to which each respective receiver is coupled, wherein each of the plurality of receivers is configured to process selectively filtered optical signals received at its respective wavelength and convert the respective selectively filtered optical signals into an electrical signal for output to one or more output electrical ports;
   a plurality of transmitters operable to receive a plurality of electrical input signals convert the electrical signals to optical signals, and couple each respective one of the optical signals resulting from the conversion of the received plurality of electrical input signals to a respective one filter of a second set of the serially arranged plurality of wavelength selective filters for transmission on the first optical fiber;
   a second collimator operable to receive the modified collimated beam from the serially arranged plurality of wavelength selective filters and to couple the modified collimated beam to a pass through fiber port, the pass through fiber port being operable to transmit a modified light beam comprising the one or more non-selected optical signals.

8. The add/drop multiplexer of claim 7, wherein the plurality of receivers are operable to convert optical signals received by the add/drop multiplexer into electrical signals.

9. The add/drop multiplexer of claim 8, wherein the plurality of transmitters are operable to convert electrical signals received by the add/drop multiplexer into optical signals operable for transmission via the fiber port.

10. A system, comprising:
    a first add/drop multiplexer comprising a first collimator and a second collimator arranged in series with a plurality of serially arranged wavelength selective filters;

wherein the first collimator is configured to receive an input beam from a first fiber port and to produce a collimated beam within the first add/drop multiplexer;

wherein the wavelength selective filters are configured to add/drop respective optical signals from the collimated beam at selected wavelengths based on the plurality of serially arranged wavelength selective filters while passing a plurality of non-selected wavelengths from the collimated beam to generate a first modified collimated beam through to the second collimator, the second collimator being operable to couple the first modified collimated beam to a second fiber port and to process the first modified collimated beam for output to the second fiber port as a first output signal; and a second add/drop multiplexer coupled to the second fiber port.

\* \* \* \* \*